(12) United States Patent
Jiang et al.

(10) Patent No.: US 8,828,224 B2
(45) Date of Patent: Sep. 9, 2014

(54) DEVICE FOR PURIFYING OILY WASTEWATER

(75) Inventors: Xuewen Jiang, Beijing (CN); Yukai Zhang, Beijing (CN); Yangshan Wu, Beijing (CN)

(73) Assignee: Beijing OTC Energy & Environment Engineering Public Limited Company, Beijing (CN)

( * ) Notice: Subject to any disclaimer, the term of this patent is extended or adjusted under 35 U.S.C. 154(b) by 22 days.

(21) Appl. No.: 13/144,865

(22) PCT Filed: Jun. 21, 2010

(86) PCT No.: PCT/CN2010/073786
§ 371 (c)(1),
(2), (4) Date: Jul. 15, 2011

(87) PCT Pub. No.: WO2011/160271
PCT Pub. Date: Dec. 29, 2011

(65) Prior Publication Data
US 2013/0062272 A1    Mar. 14, 2013

(51) Int. Cl.
| C02F 1/38 | (2006.01) |
| C02F 1/40 | (2006.01) |
| C02F 1/52 | (2006.01) |
| B01D 21/01 | (2006.01) |
| B01D 21/26 | (2006.01) |
| B01D 21/24 | (2006.01) |

(52) U.S. Cl.
USPC .......... 210/199; 210/207; 210/260; 210/262; 210/512.1

(58) Field of Classification Search
CPC ............. C02F 1/001; C02F 1/24; C02F 1/38; C02F 1/40; C02F 1/52; C02F 1/5281; C02F 11/00; C02F 2301/026; C02F 2103/365; B03D 3/00; B03D 3/02; B03D 3/06; B01D 17/02; B01D 21/0012; B01D 21/0045; B01D 21/08; B01D 21/2411; B01D 21/245; B01D 21/2494; B01D 21/01
USPC ......... 210/199, 205, 207, 208, 219, 220, 260, 210/262, 257.1, 258, 259, 261, 294, 512.1
See application file for complete search history.

(56) References Cited

U.S. PATENT DOCUMENTS

| 6,358,407 B1 | 3/2002 | Liao et al. ........................ 210/97 |
| 2008/0185321 A1* | 8/2008 | Beaulieu ......................... 210/88 |

FOREIGN PATENT DOCUMENTS

| CN | 200949066 | 9/2007 |
| CN | 101113042 | 1/2008 |
| CN | 101279778 | 10/2008 |
| CN | 201132782 | 10/2008 |

* cited by examiner

*Primary Examiner* — Lucas Stelling
(74) *Attorney, Agent, or Firm* — Fulbright & Jaworski, LLP

(57) ABSTRACT

There is disclosed a device for purifying oily wastewater, including a vertical tank of an atmospheric pressure, inside which a central coagulation reaction tube, a reverse cone-shaped cyclone flocculation stage, a suspended sludge filtering zone and a purified water commutation stage of inclined plates are included from bottom to top sequentially, oily wastewater is sequentially subjected to a coagulation reaction, suspended sludge filtering and a purified water commutation process and then discharged, a sludge collecting groove collects and guides the suspended sludge to a sludge concentrating zone for further sedimentation and concentration processes and then discharges it to external to the tank, in this way, the purification reaction, flocculation and fine filtration of wastewater and the sludge concentration process are integrated within the same wastewater purifying device. Thus, the device is equivalent to the existing wastewater pretreatment system plus a fine filtration system.

8 Claims, 1 Drawing Sheet

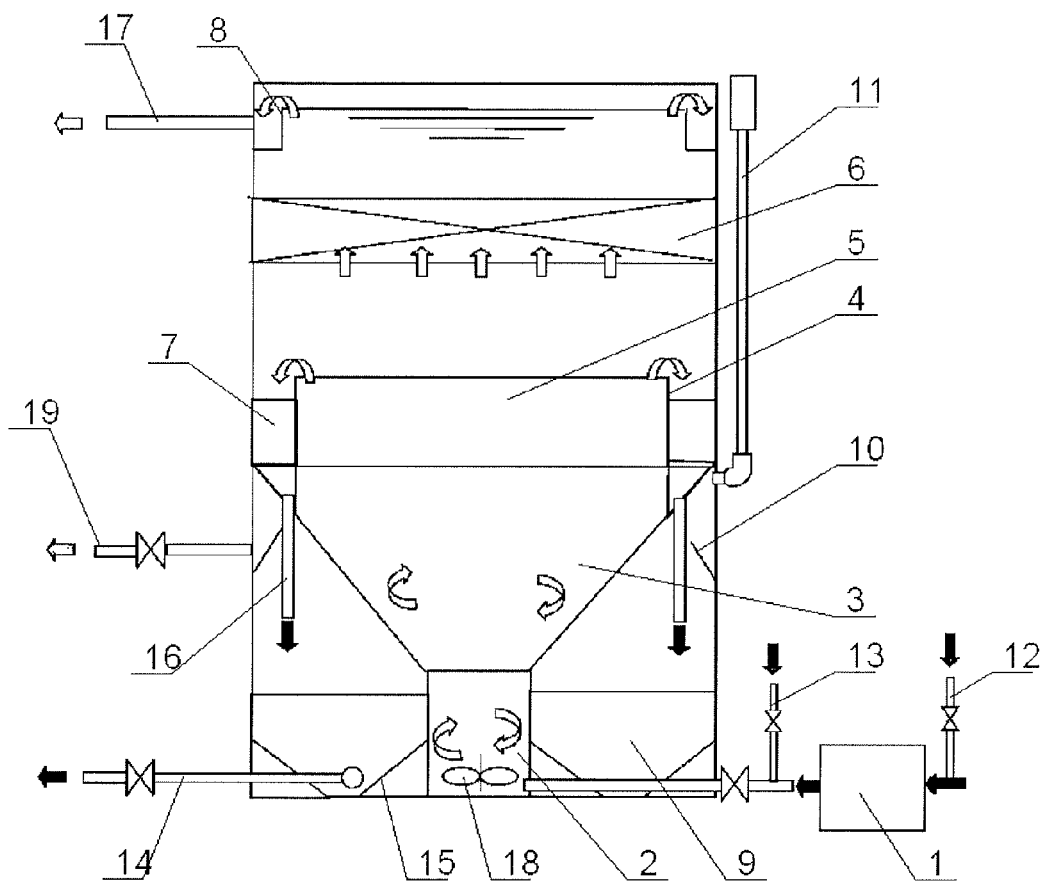

DEVICE FOR PURIFYING OILY WASTEWATER

CROSS-REFERENCE TO RELATED APPLICATIONS

This application is a national phase application under 35 U.S.C. §371 of International Application No. PCT/CN2010/073786 filed 21 Jun. 2010, which is incorporated herein by reference in its entirety.

FIELD OF THE INVENTION

The present application relates to the field of oily wastewater treatment technologies, and particularly, to a device for purifying oily wastewater that is applicable to oilfield reinjection and petrochemical enterprises.

BACKGROUND OF THE INVENTION

At present, a way of exploitation by means of water injection is mostly adopted in the oilfield, and water of about 5-8 $m^3$ is reinjected underground for exploiting every one ton of crude oil. Produced water of the oilfield is almost entirely reinjected underground after being treated. The oil yield of the oilfield is affected if the wastewater containing a considerable amount of contaminants such as suspended solid and emulsified oil is reinjected underground. Therefore, technologies and equipment for treating oilfield wastewater for reinjection are essential to the exploitation and production of the oilfield.

The traditional technologies and equipment for the treatment of wastewater with the use of two-stage sedimentation and two-stage filtration have drawbacks of a long purification process, a large system and a low purification efficiency, and thus are difficult to satisfy technology requirements for purifying the produced water enriched with emulsified oil and suspended solid. Further, the traditional technology system for the treatment of oily wastewater is disadvantageous for a low efficiency and unstable operations. Wastewater treatment technology using a ceramic ultrafiltration membrane has been studied since 1991, but is still within the industrial trial stage due to the high price of the ceramic membrane, strict pretreatment requirements and strict requirements on the cleaning of the membrane. In addition, the deoiling technology using a cyclone, although being advantageous for simple facilities and low costs, cannot obtain water qualified for the reinjection from the treatment of the produced water. For oilfields and petrochemical enterprises, therefore, there is a demanding need for new technologies and equipment for treating wastewater that have a high purification efficiency and low investment and maintenance costs, and are able to obtain water meeting the existing criterions for reinjection water or recycled water from the treatment of the produced water.

SUMMARY OF THE INVENTION

An object of the present invention is to provide an improved device for an oily wastewater purifying system, with a simple but reliable treatment process, low investment and operation costs, low land occupation, and effective solid-liquid separation, in order to overcome the existing drawbacks, such as a long process, a large investment, a low treatment efficiency and complicated operations and management of a filtration tank, that exist in the treatment of oilfield produced water and petrochemical discharged water, and solve the technical problems of pretreatment of oily wastewater from petrochemical enterprises prior to its biological treatment and tertiary treatment after the biological treatment.

An object of the present invention is implemented with technical solutions described below.

There is provided a device for purifying oily wastewater, including a vertical tank of an atmospheric pressure, inside which a central coagulation reaction tube, a reverse cone-shaped cyclone flocculation stage, a suspended sludge filtering zone and a purified water commutation stage of inclined plates are included from bottom to top sequentially, the central coagulation reaction tube is provided with a wastewater inlet at its bottom along a tangent direction, a weir plate is arranged peripherally around the suspended sludge filtering zone, thereby forming a sludge collecting groove which is in communication with a sludge concentrating zone via a sludge overflow pipe, the sludge concentrating zone is connected to a sludge discharging pipe, and a weir plate is arranged above the purified water commutation stage of inclined plates along the wall of the vertical tank and forms a purified water outlet which is connected to a water outlet pipe.

Further, an agitator of an adjustable rotation speed is installed at the bottom of the central coagulation reaction tube.

Further, a sludge outlet is arranged at the top of the sludge concentrating zone, an air baffling plate is installed below the sludge outlet, and an air outlet pipe is installed above the air baffling plate.

Further, a sludge bucket may be arranged at the sludge concentrating zone and connected to a sludge discharging pipe.

Further, a wastewater lifting pump may be arranged at upstream of the wastewater inlet, and an agent input inlet and a backup agent input inlet are arranged at inlet and outlet pipes of the wastewater lifting pump, respectively.

The internal structure of the device in the present application is designed precisely based on the coagulation mechanism. When wastewater added with agent(s) is injected to the bottom of the cylindrical central coagulation reaction tube along a tangent direction, the flow direction of the wastewater is changed significantly due to the particular structure of the cylindrical body of the central coagulation reaction tube. Due to the additional agitation of the agitator, a relatively strong turbulence of the wastewater occurs so that the agent is sufficiently mixed with the wastewater. At this point, sludge particles in the wastewater are within the initial flocculation stage, and the turbulence has an insignificant influence on the flocculation. As the flocculation proceeds, the sludge particles are getting bigger. As the sludge flocculation proceeds to the late flocculation stage, the turbulence has a more and more negative influence on the flocculation. At this point, in favor of the demand of flocculation process, the mixture of the agent and wastewater flows into the reverse cone-shaped cyclone flocculation stage, where the section is getting larger, the flow speed is gradually reduced, and the flowage of the mixture is alleviated. Thus, the flocculation action is substantially completed at the little bottom of the reverse cone-shaped cyclone flocculation stage. The sludge particles after the flocculation have a density that is getting larger as the sludge particles rise, while the flow speed of the mixture is getting lower. Subsequently, sludge particles that are gradually sedimentated are supported and pressed by the rising flow of wastewater continuously inputted from the lower portion of the vertical tank; as a result, the sludge remains stationary when its gravity is equal to the applied support and pressing forces, thereby forming a filtering layer of suspended sludge at the suspended sludge filtering zone. Particles in the filtering layer of suspended sludge are getting bigger as the filtering layer intercepts contaminants carried by the incoming water, and thus have an increasing sedimentation speed, so that the rising speed of water flow and water yield can be improved, and the filtration effect can be achieved.

The dense filtering layer of suspended sludge is composed of flocs formed from both the suspended solid carried in the wastewater and the coagulant. The lower surface layer of the filtering layer grows thicker increasingly as the flocs move upwards. Further, as a bypass in the tank caused by the filtered water according to hydraulic mechanism flows, sludge of the upper surface layer of the filtering layer of suspended sludge is guided continuously into the peripheral sludge collecting groove, so that the upper surface layer is continuously reduced and gets thinner, and the thickness of the filtering layer of suspended sludge reaches a homeostasis. When the wastewater subjected to the coagulation goes upwards through the filtering layer of suspended sludge, i.e. a filtering layer of flocs, contaminants such as suspended colloid particles, flocs and bacteria thalluses are intercepted within the filtering layer of suspended sludge due to combined forces of interfacial physical adsorption and netting catch, electrochemical characteristics of the filtering layer of flocs, an effect of Van der Waals forces, as well as an effect of mechanical filtration, so that the resultant water has a quality as high as that of water produced from fine filtration. The filtering layer of suspended sludge, which is composed of the flocs and has a high density, has a filtering efficiency fairly higher than that of the conventional filtering using a sand layer. Also, the filtering layer of suspended sludge has a very low head loss (i.e., resistance) caused by the filtration, because it is formed of the suspended sludge, and therefore has a head loss fairly less than that of the conventional filtering using the sand layer, the filtering using micropores or the filtering using a reverse osmosis membrane. Further, the filtering layer of sludge is automatically supplemented by the suspended solid carried in the wastewater during the purification process in addition to being reduced automatically, that is, the filtering layer of sludge is updated continuously, thus maintaining a stable thickness and stable physical and electrochemical absorption capabilities, thereby achieving a stable filtering effect, and eliminating a backwashing process of the filtering material layer and updating and supplementing of filtering materials that are essential in the conventional filtering system.

The device disclosed in the application is advantageous in that oily wastewater is sequentially subjected to the coagulation reaction and the processes of suspended sludge purification and purified water commutation, by means of the internal structure of the device, so that the purification reaction, flocculation and fine filtration of wastewater and the sludge concentration process are implemented integrally within the tank body of the same device for purifying wastewater. Therefore, the device described in the present application has advantages such as a simple but reliable purification process, low investment and operation costs, low land occupation, less restrict requirements on the wastewater, an improved purification efficiency, and elimination of backwashing of the filtering material layer and pollution of filtering materials, thereby providing a novel way applicable to the reinjection of oilfield produced water and the purification treatment of wastewater of petrochemical enterprises, as well as invaluable social benefits and economical benefits.

BRIEF DESCRIPTION OF THE DRAWINGS

The present invention is now further described below with reference to the drawings and embodiments of the invention.

FIG. 1 is a schematic diagram showing the structure of a device for purifying oily wastewater according to an embodiment of the invention.

DESCRIPTION OF REFERENCE NUMERALS IN FIG. 1

1: Wastewater lifting bump pump;
2: Central coagulation reaction tube;
3: Reverse cone-shaped cyclone flocculation stage;
4: Weir plate;
5: Suspended sludge filtering zone;
6: Purified water commutation stage of inclined plates;
7: Sludge collecting groove;
8: Weir plate;
9: Sludge concentrating zone;
10: Air baffling plate;
11: Air outlet pipe;
12: Agent input inlet;
13: Backup agent input inlet;
14: Sludge discharging pipe;
15: Sludge bucket;
16: Sludge overflow pipe;
17: Water outlet pipe;
18: Agitator;
19: Sludge outlet.

DETAILED DESCRIPTION OF THE EMBODIMENTS

As shown in FIG. 1, a device for purifying oily wastewater according to an embodiment of the invention includes a vertical tank of an atmospheric pressure, inside which a central coagulation reaction tube 2, a reverse cone-shaped cyclone flocculation stage 3, a suspended sludge filtering zone 5 and a purified water commutation stage of inclined plates 6 are included from bottom to top sequentially. The central coagulation reaction tube 2 is provided with a wastewater inlet at its bottom along a tangent direction. Also, at the bottom of the central coagulation reaction tube 2, an agitator having an adjustable rotation speed is provided, and the rotation speed may be set depending upon properties of the oily wastewater for achieving an optimal mixing effect.

A weir plate 4 is installed peripherally around the suspended sludge filtering zone 5, thereby forming sludge collecting groove(s) 7 which are in communication with a sludge concentrating zone 9 via sludge overflow pipe(s) 16. The sludge concentrating zone 9 is connected to a sludge discharging pipe 14. A weir plate for outlet 8 is arranged above the purified water commutation stage of inclined plates 6 along walls of the vertical tank and forms a purified water outlet which is connected to a water outlet pipe 17.

The sludge concentrating zone 9 is composed of an annular space that is limited by peripheries of the central coagulation reaction tube 2 and the reverse cone-shaped cyclone flocculation stage 3 and the walls of the vertical tank. An air baffling plate 10 is installed in the upper portion of the annular space, while an air outlet pipe 11 connected to the external atmosphere is arranged at the top of the annular space. The sludge concentrating zone 9 is further provided with a sludge bucket 15 connected to a sludge discharging pipe 14 extending through the wall of the vertical tank to the external, thereby facilitating the collection and discharge of the concentrated sludge.

A wastewater lifting pump 1 is installed at upstream of the wastewater inlet of the device. An agent input inlet 12 and a backup agent input inlet 13 are arranged at the inlet and outlet pipes of the wastewater lifting pump 1, respectively, to facilitate addition of various appropriate agents such as an efficient degreasing agent, composite purificant, a coagulant aid, and a coagulant.

By taking advantage of the internal structure of the oily wastewater purifying device, the oily wastewater is sequentially delivered to the central coagulation reaction tube 2 and the reverse cone-shaped cyclone flocculation stage 3 for the purpose of coagulation reaction, then delivered to the suspended sludge filtering zone 5 for filtering out the suspended sludge, and then delivered to the purified water commutation stage of inclined plates 6 for the commutation and subsequent discharge of the purified water. The suspended sludge is collected by the sludge collecting groove 7 and guided to the sludge concentrating zone 9, to be further sedimentated and concentrated and then discharged. In this way, the processes of purification reaction, flocculation and fine filtration of the oily wastewater and the concentration of sludge are implemented integrally within the tank body of the same device for purifying wastewater.

Based on the novel design of the inventive device described above, a dense layer of suspended sludge formed from the wastewater per se is used for the water purification and filtration, which is different from and superior to the traditional mechanical filtration manner, so that the entire purification system has a simpler device structure and a shorter but more reliable process, and is applicable to directly receive the produced water from oil well stations and treat it into water of class A. Functionally, the inventive device is equivalent to the existing wastewater pretreatment system plus a fine filtration system, thus avoiding the cleaning, supplement and replacement of filtering materials, so that the costs for replacing the filtering materials are saved and the costs for operation and maintenance are reduced while ensuring the water quality. The inventive device applies less restrict requirements on the quality of incoming water, and therefore may be widely used as the substitute for the three processes of coagulation, sedimentation or air flotation, and fine filtration during the treatment of various industrial wastewater and sanitary sewage.

The invention claimed is:

1. A device for purifying oily wastewater, comprising a vertical tank of an atmospheric pressure, inside which a central coagulation reaction tube, a cone-shaped cyclone flocculation stage, a suspended sludge filtering zone and a purified water commutation stage of inclined plates are included from bottom to top sequentially, the central coagulation reaction tube is provided with a wastewater inlet at a bottom of the central coagulation reaction tube along a tangent direction, a weir plate is arranged peripherally around the suspended sludge filtering zone, thereby forming a sludge collecting groove between the weir plate and a wall of the vertical tank, wherein the sludge collecting groove is in communication with a sludge concentrating zone via a sludge overflow pipe, the sludge concentrating zone is connected to a sludge discharging pipe, and a weir plate is arranged above the purified water commutation stage of inclined plates along a wall of the vertical tank and forms a purified water outlet which is connected to a water outlet pipe.

2. The device of claim 1, wherein an agitator having an adjustable rotation speed is provided at the bottom of the central coagulation reaction tube.

3. The device of claim 1, wherein a sludge outlet is arranged at the top of the sludge concentrating zone, an air baffling plate is arranged below the sludge outlet, and an air outlet pipe is arranged above the air baffling plate.

4. The device of claim 1, wherein a sludge bucket is arranged within the sludge concentrating zone and connected to the sludge discharging pipe.

5. The device of claim 1, wherein a wastewater lifting pump is arranged at upstream of the wastewater inlet, and an agent input inlet and a backup agent input inlet are arranged at inlet and outlet pipes of the wastewater lifting pump, respectively.

6. The device of claim 2, wherein a wastewater lifting pump is arranged at upstream of the wastewater inlet, and an agent input inlet and a backup agent input inlet are arranged at inlet and outlet pipes of the wastewater lifting pump, respectively.

7. The device of claim 3, wherein a wastewater lifting pump is arranged at upstream of the wastewater inlet, and an agent input inlet and a backup agent input inlet are arranged at inlet and outlet pipes of the wastewater lifting pump, respectively.

8. The device of claim 4, wherein a wastewater lifting pump is arranged at upstream of the wastewater inlet, and an agent input inlet and a backup agent input inlet are arranged at inlet and outlet pipes of the wastewater lifting pump, respectively.

* * * * *